United States Patent
Godlewski

(10) Patent No.: US 9,174,693 B2
(45) Date of Patent: Nov. 3, 2015

(54) THREE-WHEELED CYCLE

(71) Applicant: Standard Bearer Machines, LLC, San Clemente, CA (US)

(72) Inventor: Peter Godlewski, San Clemente, CA (US)

(73) Assignee: Standard Bearer Machines, LLC, San Clemente, CA (US)

( * ) Notice: Subject to any disclaimer, the term of this patent is extended or adjusted under 35 U.S.C. 154(b) by 0 days.

(21) Appl. No.: 14/477,775

(22) Filed: Sep. 4, 2014

(65) Prior Publication Data

US 2015/0069732 A1   Mar. 12, 2015

Related U.S. Application Data

(60) Provisional application No. 61/874,792, filed on Sep. 6, 2013.

(51) Int. Cl.
| | | |
|---|---|---|
| *B62K 5/05* | (2013.01) | |
| *B62K 5/08* | (2006.01) | |
| *B62K 5/10* | (2013.01) | |
| *B62K 9/02* | (2006.01) | |
| *B62K 5/00* | (2013.01) | |

(52) U.S. Cl.
CPC ... *B62K 5/05* (2013.01); *B62K 5/08* (2013.01); *B62K 5/10* (2013.01); *B62K 9/02* (2013.01); *B62K 2005/001* (2013.01)

(58) Field of Classification Search
CPC .............. B62K 9/02; B62K 5/05; B62K 5/02; B62K 5/06; B62K 5/08
See application file for complete search history.

(56) References Cited

U.S. PATENT DOCUMENTS

| | | | |
|---|---|---|---|
| 3,561,778 A | 2/1971 | La Brie | |
| 3,854,754 A | 12/1974 | Jablonski | |
| 4,248,448 A | 2/1981 | Dmitrowsky | |
| 4,277,078 A * | 7/1981 | Root | 280/269 |
| 4,290,620 A * | 9/1981 | Chika | 280/209 |
| 4,456,277 A | 6/1984 | Carpenter | |
| D357,215 S | 4/1995 | Cummings | |
| 6,953,203 B2 * | 10/2005 | Wilcox et al. | 280/282 |
| 7,017,685 B2 | 3/2006 | Schoenberg | |
| 7,073,806 B2 | 7/2006 | Bagnoli | |
| 7,661,501 B1 | 2/2010 | Perdue | |
| 7,661,690 B2 | 2/2010 | McClure | |

(Continued)

FOREIGN PATENT DOCUMENTS

| | | |
|---|---|---|
| DE | 19511629 | 3/1995 |
| WO | WO 2005/120939 | 6/2005 |

OTHER PUBLICATIONS

The Prone Bicycle Company; http://www.pronebicycle.com; p. 1; Apr. 13, 2015.

(Continued)

*Primary Examiner* — Kevin Hurley
(74) *Attorney, Agent, or Firm* — Knobbe, Martens, Olson & Bear, LLP

(57) ABSTRACT

A three-wheeled cycle is provided that can be ridden in an upright position. The cycle can have a suspension system for traversing rough terrain and for traction when turning. The front wheels can have a steering assembly comprised of a two-piece steering arm that clamps the handlebar to the front fork and connection rod with linkage pins. Furthermore, the design of the cycle can be favorable for transport of additional cargo loads.

15 Claims, 8 Drawing Sheets

(56) References Cited

U.S. PATENT DOCUMENTS

| | | | |
|---|---|---|---|
| 7,708,291 | B1 | 5/2010 | Henderson |
| 7,748,728 | B2 | 7/2010 | Dixon |
| 2004/0140698 | A1 | 7/2004 | Urban |
| 2005/0236803 | A1 | 10/2005 | Summers et al. |
| 2007/0277641 | A1 | 12/2007 | Versey |
| 2008/0073467 | A1 | 3/2008 | Miller et al. |
| 2008/0115994 | A1* | 5/2008 | Martini et al. ............... 180/210 |
| 2009/0277708 | A1 | 11/2009 | Martino |
| 2010/0194068 | A1 | 8/2010 | Henderson |
| 2014/0175770 | A1* | 6/2014 | James ......................... 280/231 |
| 2015/0042063 | A1* | 2/2015 | Serpa .......................... 280/267 |

OTHER PUBLICATIONS

Semi-Prone Bicycle, Utility U.S. Appl. No. 06/015,856; (May 28, 1996); Semi-Prone Bicycle—http://www.tomwbell.com/patents/Semi-Prone.html. v.2009.07.13; Apr. 13, 2015.

Prone Bicycle—http://en.wikipedia.org/wiki/Prone-bicycle; pp. 1-2; Apr. 13, 2015.

The Prone Position Bicycle; Sairah Abbas, Denver Jermyn, Anneliis Tosine and Daniel Vena; University of Guelph, Proceedings of the ENGG 3100: Design III projects, 2007; pp. 1-2.

Atomic Zombie's Bicycle Builder's Bonanza; McGraw-Hill; Brad Graham & Kathy McGowan; pp. 151-185; copyright 2004.

* cited by examiner

THREE-WHEELED CYCLE

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

1. Field

The present disclosure relates to cycles and, more particularly, to a three-wheeled cycle (tricycle) configured with two front wheels.

2. Description of Related Art

Since the early 1980's, bicycling has advanced for use in different terrains and for practical uses beyond simple transport and road racing. The concept of the mountain bike created a new recreational industry by allowing bicyclists to ride on trails and uneven ground that would be inaccessible to bicycles without suspensions and high ratio gearing. More recently, fat-tire bicycles have entered the industry to allow bicyclists to ride in snow and extend the bicycling season into winter in regions with snow fall. Delivery tricycles have been in use for decades in some countries and recent years have brought the introduction of the cargo cycle. These cycles are designed to support greater loads that would be dangerous on standard, short-wheelbase bicycles.

Three-wheeled and four-wheeled human powered designs (tricycles, quadracycles) have also evolved to address the comfort of the rider and stability at low speeds. Recumbent three-wheeled cycles have tremendous stability due to their low center of gravity keeping the rider close to the ground. Riders are safer in sudden stops and in sharp turns. Upright, three-wheel vehicles allow the rider to maintain the upright stance of a bicyclist without the need for balance at low speeds. Furthermore, some designs have addressed the problem of vertical stability by allowing the rider to lean into turns at higher speeds, as disclosed in U.S. Pat. No. 7,708,291.

In recent years, people can choose from a variety of bicycles and tricycles to address specific transportation needs, but few if any offer the equivalent scope of utility of a pick-up truck that can work to carry loads as well as offer convenient transport on multiple surfaces and situations. Gas prices, traffic congestion, and environmental awareness have compelled more people to decisions about using mountain bikes, cargo bikes, recumbent tricycles, and upright tricycles as the means for short distance commuting and alternatives to other motorized transport.

SUMMARY

An aspect of at least one of the embodiments disclosed herein includes the realization that there remains a need for an improved cycle. In spite of the above mentioned advances, the new design directions in bicycling face drawbacks as practical transportation vehicles, particularly on rough terrain. Mountain bikes are designed for off-road activity, but do not have the cargo carrying capabilities of either the cargo bike or a tricycle. Also, mountain bikes can be difficult to control on uneven and rough terrain at low speeds. Riders often still have to carry their bikes when going uphill in many situations.

Fat-tire bikes are unstable in deep sand and snow. They offer better stability than a mountain bike because the tires float on top of loose surfaces better than the narrow tires associated with mountain bikes. However as the depth of the surface increases, starting to pedal from a full stop becomes difficult due to the inability of the tires to grip the underlying surface. Likewise as the depth of the surface increases, rolling resistance increases requiring rider to slow to a crawl speed. In both circumstances, riders need to balance at low speed and with weight shifted to the rear wheel to gain traction and forward momentum. This technique is beyond the capability of average bicyclists.

Cargo bikes also lack stability. Furthermore, cargo bikes are difficult to control because of weight distribution and overall load. Depending on the weight of the cargo and the rider, the braking and turning dynamics can change. These changes expose the rider to additional safety risks in transit. Though there are, and have been, upright tricycles designed for cargo transport, there are not any designed for transport on uneven ground, which is more appropriate for a mountain bike.

Regarding recumbent three-wheeled cycles, their low ground clearance and overall low aspect ratio of these designs make them difficult to maneuver on rough ground and almost invisible by motor vehicles on the road. Leaning tricycles and recumbent three wheelers address low and high speed stability, but by design cannot perform in the same environments as mountain bicycles. Specifically for recumbent three wheelers, the recumbent position makes hill climbing difficult for a rider due to the inability of the rider to stand on the bicycle pedals to use their full weight and generate greater torque in the rear wheel as possible with an upright cycle.

Thus, cycle design enhancements fall short in stability and safety when compared to cars, motorcycles and other motorized vehicles. Each of these cycle types fall short in the broader concept of a multi-purpose human powered vehicle.

Therefore, in accordance with at least one of the embodiments disclosed herein, there is provided a cycle design that overcomes the aforementioned drawbacks. An embodiment of the present cycle design described below addresses the challenges of using human power to ride while carrying an additional load on unstable and loose ground with the utility equivalent to a modern pick-up truck. The cycle design embodies the advantages of a mountain bike, cargo cycle and a recumbent tricycle into a tricycle with suspension. With the cycle disclosed herein, the rider rides in an upright position but benefits from the stable orientation of two, for example, mountain bike or fat tire front-wheel assemblies that handle on uneven and loose surfaces while providing low-speed stability. In summary, the presently disclosed cycle provides utility in terrains inaccessible by current human powered vehicles.

The cycle can have two front wheels, each wheel coupled to a front fork that is coupled to the frame component, and one rear wheel coupled to the frame component and mechanically driven by pedals (with or without an electric or other powered assist). A steering assembly can be coupled to the front forks and include handlebars that are configured for a rider in an upright riding position.

In some embodiments, the riding cycle can include a rack for carrying cargo loads. The riding cycle can further include a shock absorber coupled to each of the front wheels to provide stability over rough terrain and turns. The rear wheel can also have a shock absorber. In some embodiments, the riding cycle can have a power assist device coupled to at least one of the front wheels or rear wheel to provide additional power, particularly when traveling up an incline or for longer distances in deep sand or snow.

In another embodiment disclosed herein, a riding cycle is disclosed having a frame component, two front wheels coupled to the frame component, one rear wheel coupled to the frame component, and a steering assembly coupled to the front wheels. The steering assembly combines the functions of clamping the front fork tube, clamping the handlebars, and linking the left and right front wheels with a minimum or reduced number of components.

In some configurations, an upright tricycle includes a rear wheel, a first front wheel and a second front wheel. A frame supports a rider in an upright position. The frame further supports the rear wheel. The frame includes a first head tube and a second head tube spaced from one another in a lateral direction of the tricycle. A first front fork is supported by the first head tube for rotation about a first steering axis, the first front fork supporting the first front wheel. A second front fork is supported by the second head tube for rotation about a second steering axis, the second front fork supporting the second front wheel. A steering assembly includes a first handlebar coupled to the first front fork and a second handlebar coupled to the second front fork. The first handlebar is coupled to the second handlebar such that rotation of either one of the first or second handlebar causes rotation of the other of the first or second handlebar.

In some configurations, the first front fork and the second front fork are suspension forks providing suspension travel to the first front wheel and the second front wheel relative to the frame.

In some configurations, the first handlebar is coupled to the second handlebar by a connecting rod.

In some configurations, the connecting rod is adjustable in length.

In some configurations, the connecting rod is the only linkage member rotationally coupling the first front wheel and the second front wheel.

In some configurations, the first handlebar is coupled to the first front fork by a first handlebar mount, wherein a first steering arm is coupled to the first handlebar mount, wherein the second handlebar is coupled to the second front fork by a second handlebar mount, wherein a second steering arm is coupled to the second handlebar mount, and wherein the connecting rod is connected between the first steering arm and the second steering arm.

In some configurations, the first steering arm is a removable portion of the first handlebar mount and the second steering arm is a removable portion of the second handlebar mount such that the first and second steering arms can be replaced to alter a steering geometry of the steering assembly.

In some configurations, the first steering arm and the second steering arm extend in a rearward direction from the first front fork and the second front fork, respectively.

In some configurations, the first steering arm and the second steering arm are angled inwardly towards one another.

In some configurations, the first handlebar is positioned between the first front fork and the first steering arm and wherein the second handlebar is positioned between the second front fork and the second steering arm in the longitudinal direction of the tricycle.

In some configurations, the first front wheel and the second front wheel each comprise a front tire width of at least 1.5 inches and wherein the rear wheel comprises a rear tire width of at least 3 inches.

In some configurations, at least one overhead rack is coupled to the frame.

In some configurations, the at least one overhead rack comprises a front rack portion and a rear rack portion.

In some configurations, each of the front rack portion and the rear rack portion comprises an upper, horizontal support member.

In some configurations, the first handlebar is separate from the second handlebar.

BRIEF DESCRIPTION OF THE DRAWINGS

The features of the devices and methods disclosed herein are described below with reference to the drawings. The illustrated embodiments are intended to illustrate, but not to limit the present application. The drawings contain the following figures.

DETAILED DESCRIPTION

In accordance with some embodiments disclosed herein, a cycle is provided that allows the rider to traverse rough terrain while providing stability and the ability to carry additional loads. For example, in some embodiments, the cycle can have three wheels for stability at slow speeds. The cycle can further have a suspension system for traversing rough terrain. Furthermore, the design of the cycle can be favorable for transport of additional cargo loads.

A cycle design having desirable features and advantages will now be described with reference to the figures. Although the following description is provided in the context of an exemplifying cycle, the features of the present cycle can provide advantages in other applications as well, for example motor vehicles, roller skates, wagons, and other wheeled transport systems.

Figure 1:
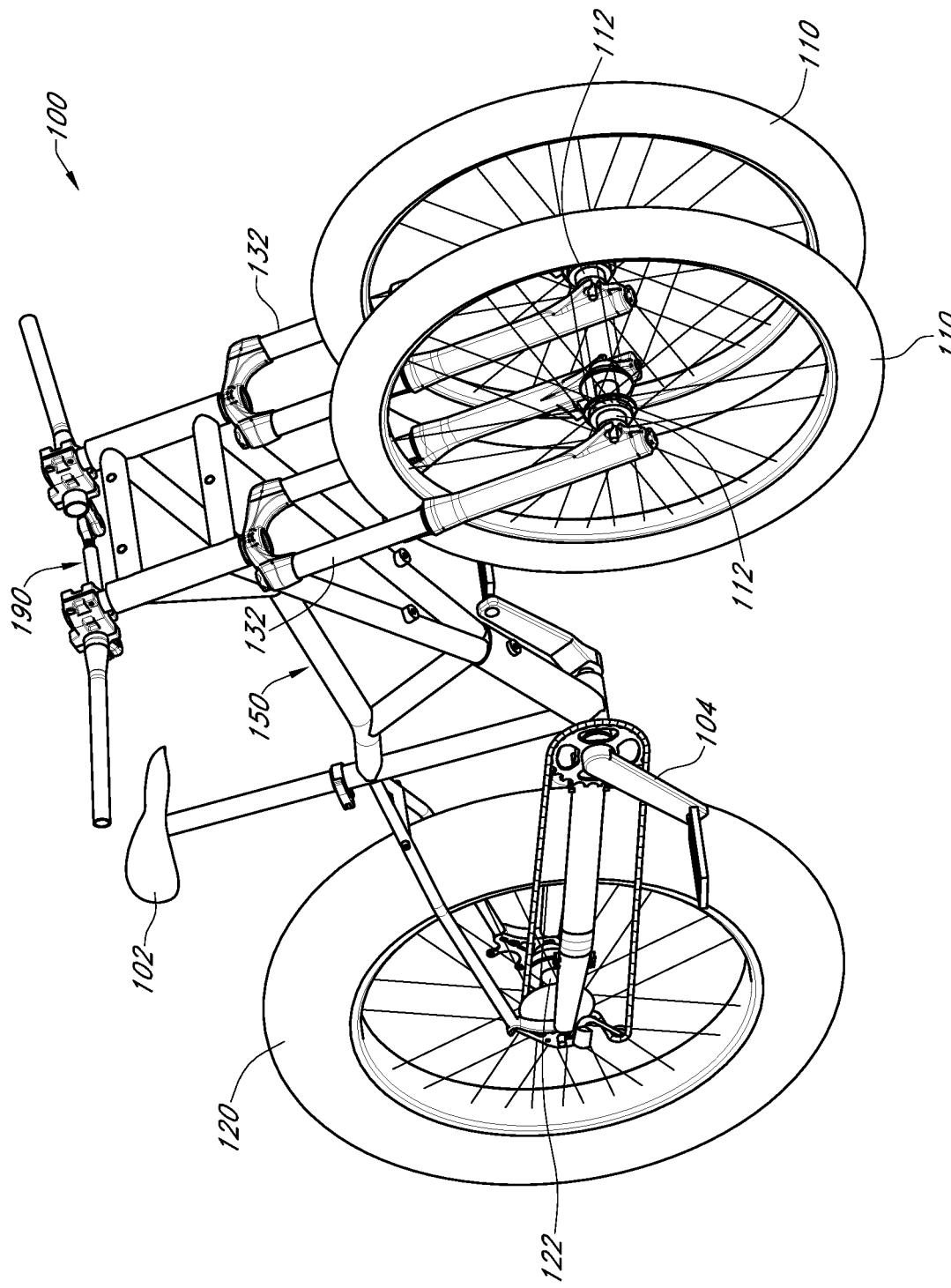
FIG. 1 is a perspective view of a cycle, according to an embodiment of the present application.

FIG. 1 illustrates an embodiment of a cycle having three wheels (tricycle). The illustrated three-wheeled cycle 100 has two front wheels 110 that rotate about respective front axles 112. The cycle 100 also includes one rear wheel 120 that rotates about a rear axle 122. Although illustrated with two front wheels 110 and one rear wheel 120, the disclosure is not limited to the illustrated configuration. For example, in other embodiments, the cycle can have one front wheel and two rear wheels. In still other embodiments, the cycle can have two front wheels and two rear wheels. Other combinations of front and rear wheels are also contemplated in this application. In some embodiments, the wheels can be standard 29" mountain bike wheels or fat tires as used with "fat-bikes". Standard mountain bike tires are often between about 1.5 to about 2.5 or 3 inches in width. "Fat-bike" tires are often between about 3 to about 6 or more inches in width. In some configurations, two standard mountain bike wheels/tires are used in the front and one "fat-bike" tire is used in the rear.

With continued reference to FIG. 1, the illustrated cycle has two front suspension forks 132, one for each front wheel 110. Preferably, the front fork 132 includes spring and damper elements, as known in the art. In other embodiments, the frame can have other designs, such as a single fork for both front wheels 110 or more than two forks for the front wheels 110. In some embodiments, the front frame can have one, two, or more than two shocks coupled to the front wheels 110. For example, the front frame can have a linkage arrangement that permits independent movement of the front wheels, and have a single shock interconnecting the front wheels that absorbs forces. The frame 150 is also coupled to the rear wheel 120. The frame 150 has a steering assembly 190 coupled toward the front of the cycle.

Figure 2:
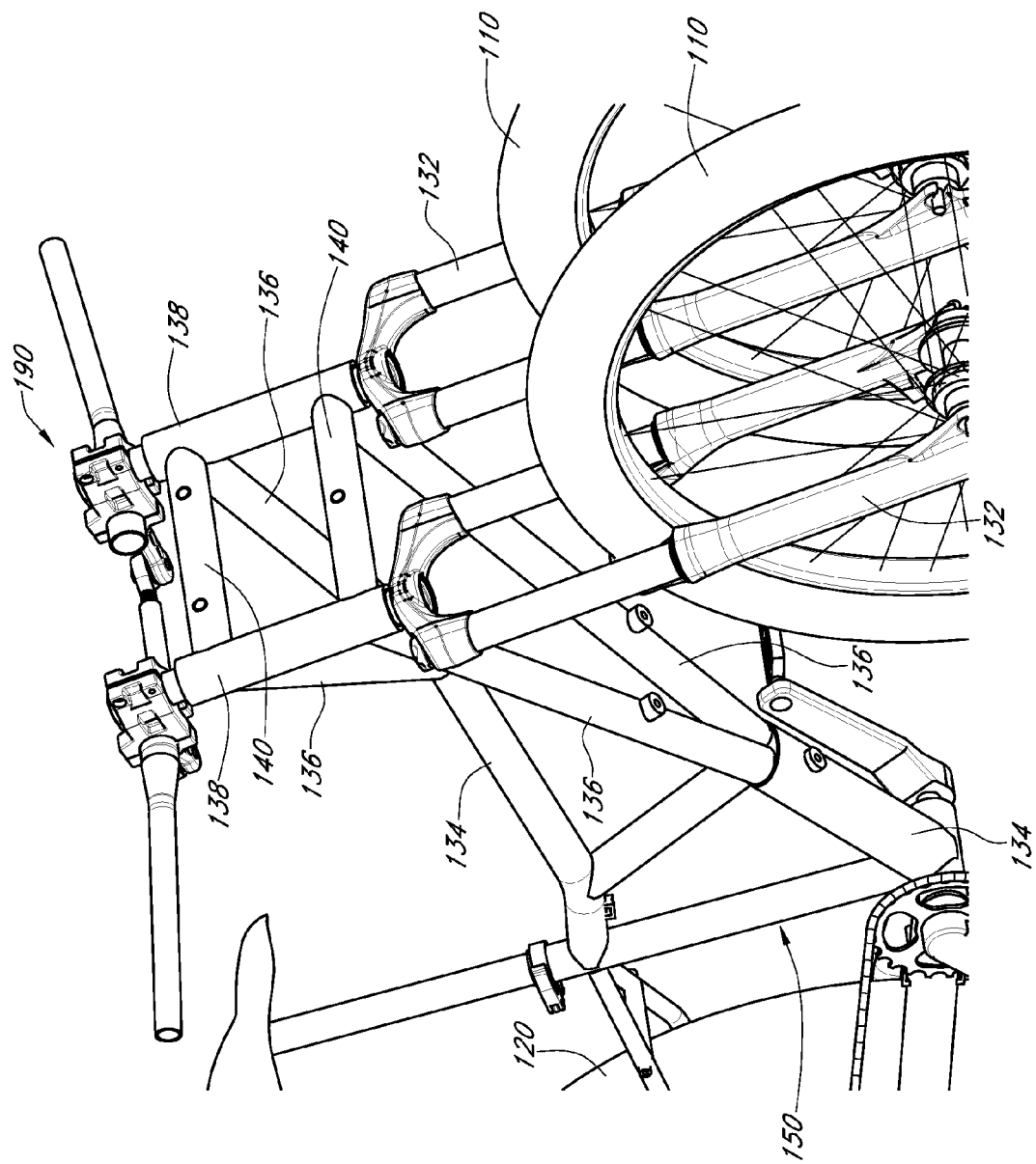
FIG. 2 is a close up view of the front of the frame depicted in FIG. 1.

FIG. 2 illustrates the frame 150 that is preferably disposed substantially between the front wheels 110 and rear wheel 120. This positioning can advantageously provide stability by placing the center of gravity between the wheels. The frame 150 supports a rider seat or saddle 102 within a seat tube of the frame 150 to allow for height adjustment. The seat 102 is positioned above and slightly rearward of the pedal crank assembly 104 of the tricycle 100. That is, a distance between the pedal crank 104 and the seat 102 is primarily vertical thereby defining an at least relatively upright seating position.

Four lateral frame members 136 (e.g., tubes) can extend from the main frame members 134 (e.g., tubes) from an end or near an end of the two main front members 134. The main front members 134 can be located one above the other and can be referred to as a top tube and down tube. In some embodiments, the lateral members 136 extend forward and laterally from the main front members 134. In other embodiments, the lateral members 136 can extend only laterally, or rearward and laterally from the main front members 134. The illustrated embodiment includes four lateral members 136 that are connected to the main front members 134 at one end of each lateral member 136 and connected to a head member 138 at the other end of each lateral member 136. Two of the lateral members 136 in the illustrated embodiment also extend upward from the main front members 134 and two of the lateral members 136 extend in the same lateral plane, however, in other embodiments, the lateral members 136 can extend downward from the main front member 134. For example, two of the lateral members 136 can extend upwardly from a forward end of the top main front member 134 ("top tube") and two of the lateral members 136 can extend from a forward end of, and in the substantially in the same plane as, the bottom main front member 134 ("down tube"). The upper lateral members 136 can be shorter than the lower lateral members 136, such as about one-half the length in some arrangements. Thus, the lower lateral members 136 can originate from a more rearward position than the upper lateral members 136. Such an arrangement provides a desirable level of rigidity to a front portion of the frame 150 while also providing clearance for pedaling motion of the user's legs.

The head members 138 can extend generally vertically and preferably at a slight rearward angle, such that the longitudinal axes of the head members 138 are generally transverse to the longitudinal axes of the lateral members 136. The longitudinal axes of the head member 138 define steering axes of the front wheels 110. The head members 138 are configured to accept steerer tubes of the front forks 132 of the two front wheels 110. In some embodiments, the head members 138 can be cylindrical tubes having a passage through them and having a length sufficient to retain a bicycle front fork and bearing assembly according to manufacturer instructions, such as for example a length of approximately 210 mm. In some embodiments, the inner diameter of the tubes can be approximately 33 mm and the outer diameter can be approximately 41 mm. In other embodiments, the length, inner diameter and/or outer diameter of the head member 138 can be any dimension appropriate for the particular embodiment. The head members 138 can be configured to accept standard suspension fork assemblies, which are readily available on the market from companies such as Fox Racing Shox and Rock Shox, among others. The suspension fork assemblies can include the wheel, shocks, disc brake and hydraulic tubing to actuate the disc brake calipers.

In some embodiments, the frame 150 can include one or more cross members 140 that connect the two laterally-spaced head members 138, as illustrated in FIG. 2. The cross member(s) 140 can help provide rigidity and strength to the frame 150. In some embodiments, the cross member(s) 140 can be a cylindrical tube with an outer diameter of approximately 34 mm and a wall thickness of 1.6 mm. In other embodiments, the outer diameter and wall thickness of the cross member(s) 140 can be configured to provide sufficient rigidity to the front frame 130.

Preferably, the frame 150 is at least partially made of lightweight aluminum, such as 6061 T6 aluminum. However, in some embodiments, the main front member 134 can include other structurally rigid and strong materials, such as for example other aluminum alloys, steel, fiberglass, carbon fiber composites, or plastics.

Figure 3:
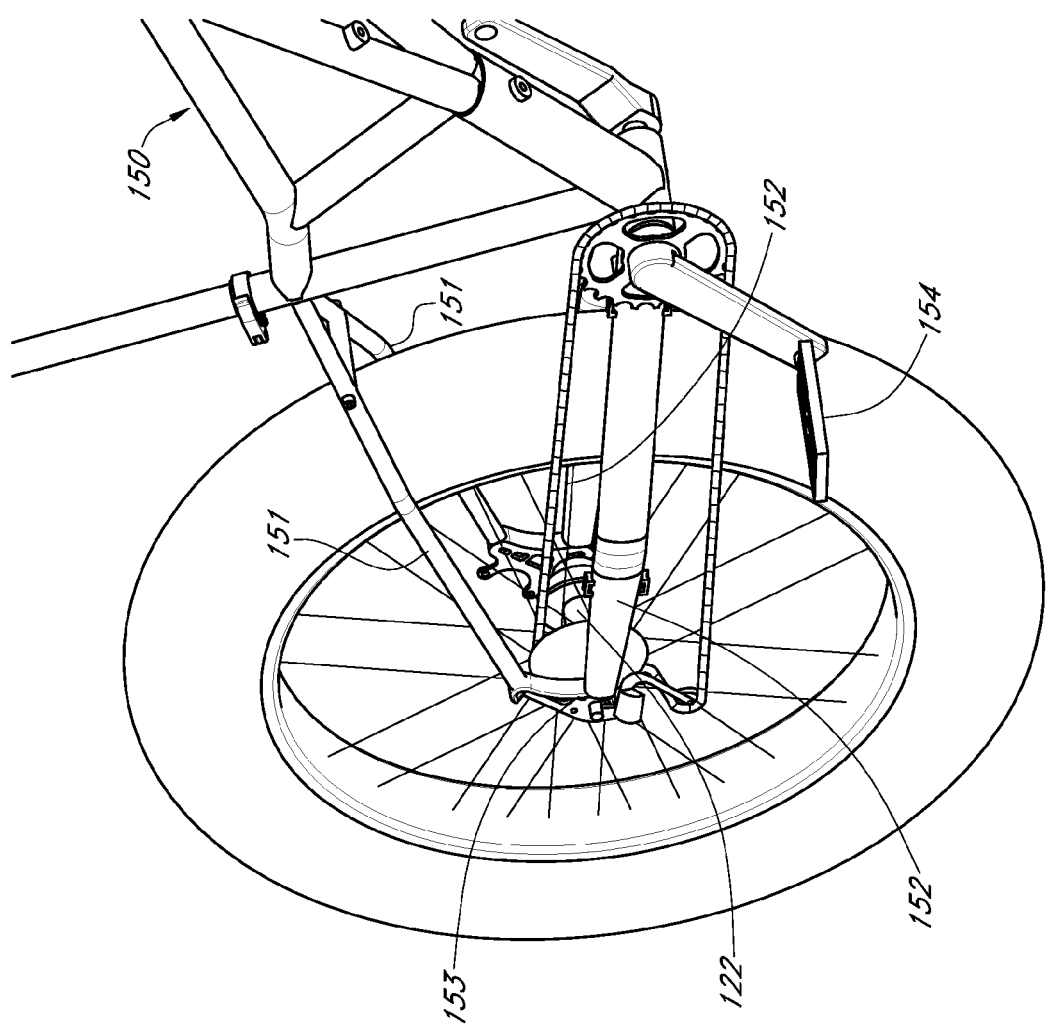
FIG. 3 is a close up view of the rear of the frame depicted in FIG. 1.

FIG. 3 illustrates the connection of the rear wheel to the frame 150. The rear wheel connector 153 ("dropout") can mate the rear wheel axle 122 to the upper support members 151 ("seat stays") and lower support members 154 ("chain stays"). In some embodiments, the rear wheel connector 153, upper support members 151 and lower support members 152 are pivotally coupled to the frame 150, to allow for the movement of a rear shock absorber. This assembly can be any design that can pivotally couple with the frame 150, some of which are known in the art. In some embodiments, this assembly can include, among other components, pedals 154, sprockets, rear shocks, rear wheel, chain, and derailleur, as illustrated in FIG. 1. Such an arrangement can be referred to as a chain-driven derailleur transmission, which is a common drive arrangement for a bicycle. Other possible drive types include belt drive and shaft drive and other possible transmission types include single speed and internally-geared or continuously-variable hubs.

Steering and Leaning

Figure 4:
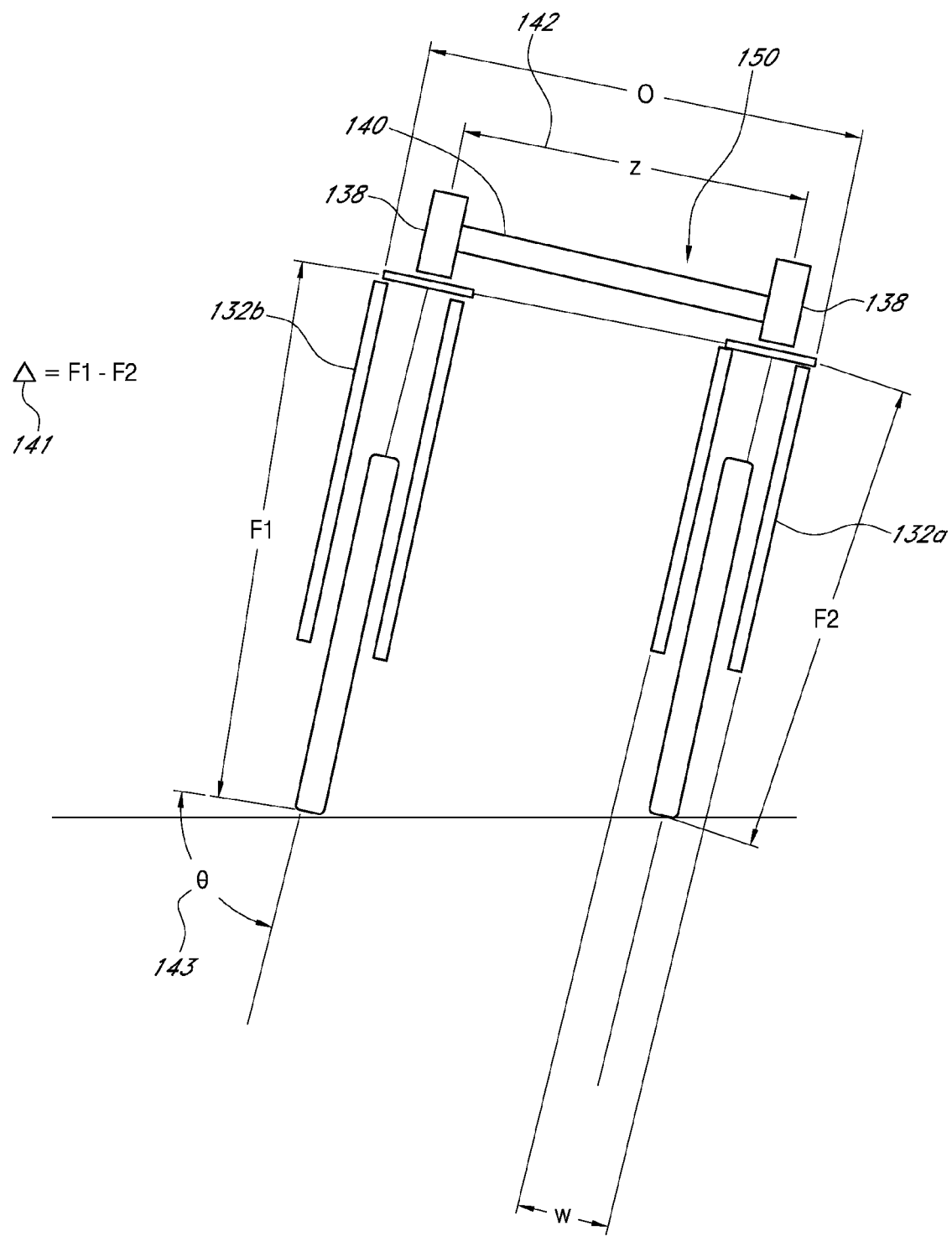
FIG. 4 is a schematic view of the front of the frame depicted in FIG. 1.

FIG. 4 illustrates a schematic view of the front of the frame 150 while leaning with suspension forks in compression and decompression, respectively, to allow front wheel contact with the riding surface for both wheels. When the rider banks into a turn, a cycle has a tendency to lean. The suspension fork inside the turn 132a compresses while the suspension fork on the outside of the turn 132b decompresses resulting in a lean-angle 143. When the cycle is leaning, the difference in length of the compressed and decompressed suspension forks 141 (fork travel) depends on the fork center-to-center distance 142, which is determined by the length of the cross member 140 and the diameter of the head members 138. To those familiar with mathematics, it can be shown using trigonometry that the required suspension fork travel 141 decreases for a given lean-angle 143 as the fork center-to-center distance 142 decreases. In some embodiments, the suspension forks 132 can have a compression length (travel) sufficient to allow for adequate lean, such as, for example and without limitation, a travel of approximately 100 mm with a center-to-center distance 142 of 241 mm. In some configurations, the cycle 100 can be configured to accommodate lean angles (including the suspension and/or tires) of between about 80 degrees to about 50 degrees or about 60 degrees to about 55 degrees while allowing both front wheels 110 to remain in contact with a flat surface, including values and sub-ranges within the aforementioned ranges. In some configurations, the center-to-center distance can fall within a range of about 200 mm to about 300 mm or about 230 mm to about 260 mm, including values and sub-ranges within the aforementioned ranges. In some configurations, the suspension travel of the front forks 132 can fall within a range of about 50 mm to about 150 mm or about 80 mm to about 100 mm, including values and sub-ranges within the aforementioned ranges. In some embodiments, non-suspension forks can be used and the compression can occur in the tires of the front wheels when the tires are sufficiently large (fat-tires) and at low enough pressure to allow compression similar to that found in suspension forks.

Figure 5:
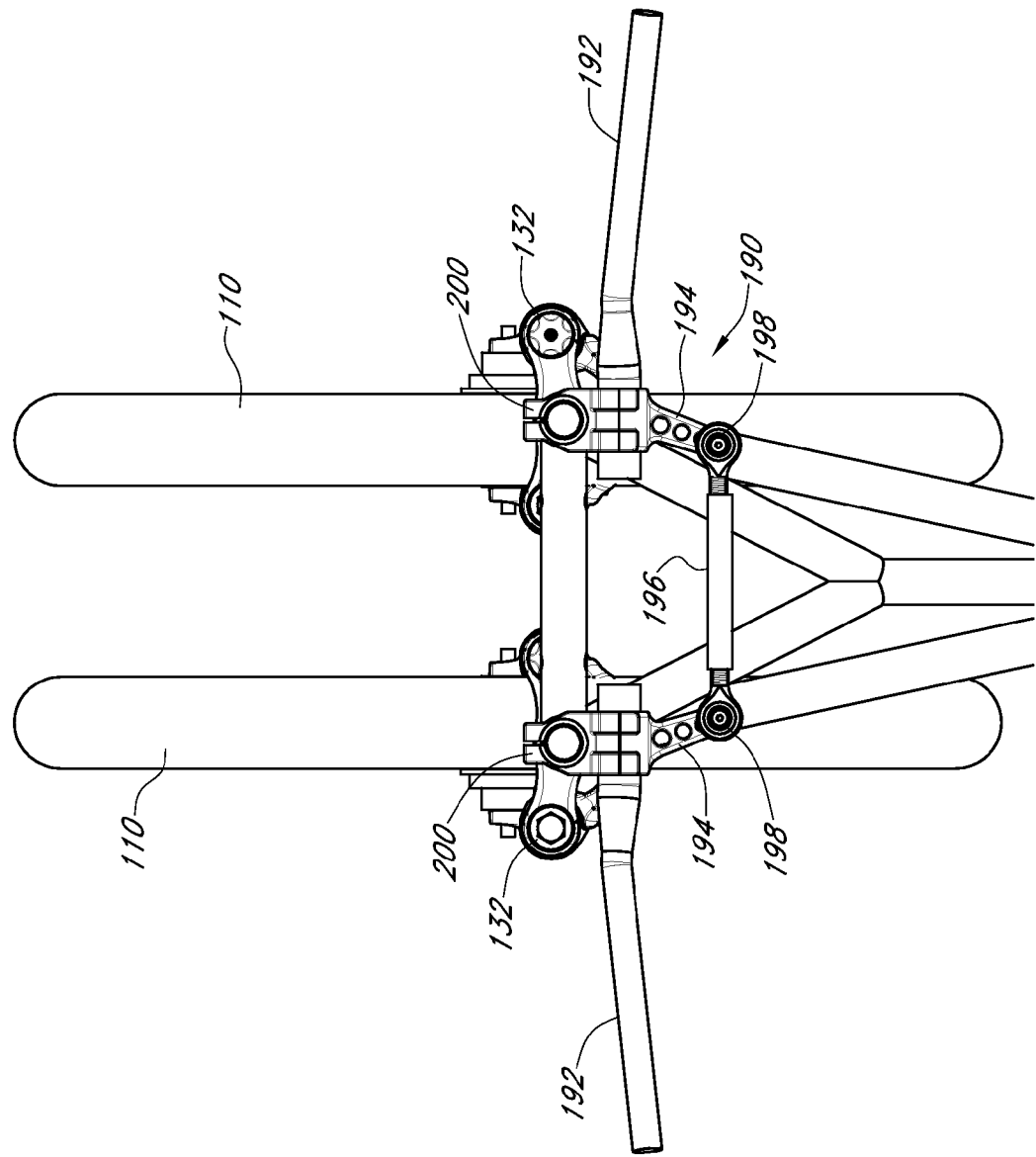
FIG. 5 is a top down view of the steering assembly of FIG. 2.

An embodiment of a steering assembly 190 is illustrated in FIG. 5. The steering assembly 190 includes handlebars 192 that are coupled to the front wheels 110 by handlebar mounts 200 that, in the illustrated embodiment, include a portion that is coupled to the steerer tube of the front fork 132 and a portion comprising steering arms 194. The portion coupled to the steerer tube of the front fork 132 can be referred to as a stem portion and the portion comprising the steering arm 194 can be referred to as a cap portion. The steering arms 194 and handlebar mounts 200 can attach to the front fork assemblies 132, as well as other components of the steering assembly 190. In some embodiments, the steering arm 194 can be configured so that the same design can be used on both sides of the front steering assembly 190 to reduce manufacturing costs and complexity.

A steering cross member 196 can interconnect the two steering arms 194 through pivot points 198. The pivot points 198 are the basis for the linkage that connects the two steering arms 194. The steering cross member 196 and pivot points 198 allow steering of the two front wheels according an Ackermann steering geometry. In some configurations, the cross member 196 is the only linkage that rotatably connects the front wheels 110. Thus, the steering assembly 190 can be relatively simple and inexpensive to manufacture and can utilize many conventional or common bicycle components (e.g., front wheels, brakes, suspension assemblies). In some embodiments, the pivot points 198 can include pins with ball joints that attach to rod ends on the steering cross member 196. For example, the pins can have a threaded shaft at one end and a ball joint on the other end. The threaded shaft can couple with a threaded hole in the steering arm 194 and the rounded ball joint can connect to a cavity on the steering cross member 196. The steering cross member 196 can be adjustable in length to allow steering alignment. In some embodiments, the distance between the two pivot points 198 can be approximately 207 mm, and have a 5 mm length adjustability. In other arrangements, the distance between the pivot points 198 can be within a range of about 200 mm to about 355 mm or about 207 mm to about 281 mm, including values and sub-ranges within the aforementioned ranges. The adjustability can be up to 10 mm, 15 mm, 20 mm or more, including values and sub-ranges within the aforementioned ranges. In some configurations, the arms 194 are angled inwardly towards one another (relative to a longitudinal direction) to provide desired steering geometry and/or additional pedaling clearance. The steering arm 194 portions of the handlebar mounts 200 can be replaced with one or more optional steering arm 194 portions having different lengths, angles or other geometries. Thus, with such an arrangement, the steering geometry and steering performance of the steering assembly 190 can be quickly, easily and inexpensively adjusted to suit a given application, expected use conditions or rider preference, for example.

With continued reference to FIG. 5, two handlebars 192 can be coupled to the front forks 132 through handlebar mounts 200 and the steering arms 194. Preferably, the right and left handlebars 192 are separate structures from one another. In some embodiments, the steerer tube portions of the handlebar mounts 200 are attached to the steering arm 194 portions of the handlebar mounts 200 with removable fasteners such as machine screws. The clamping force between the steerer tube portions of the handlebar mounts 200 and the steering arms 194 portions of the handlebar mounts 200 serve to clamp the handlebars 192 in place and can constrain the handlebars 192 from axial and radial movement.

Figure 6:
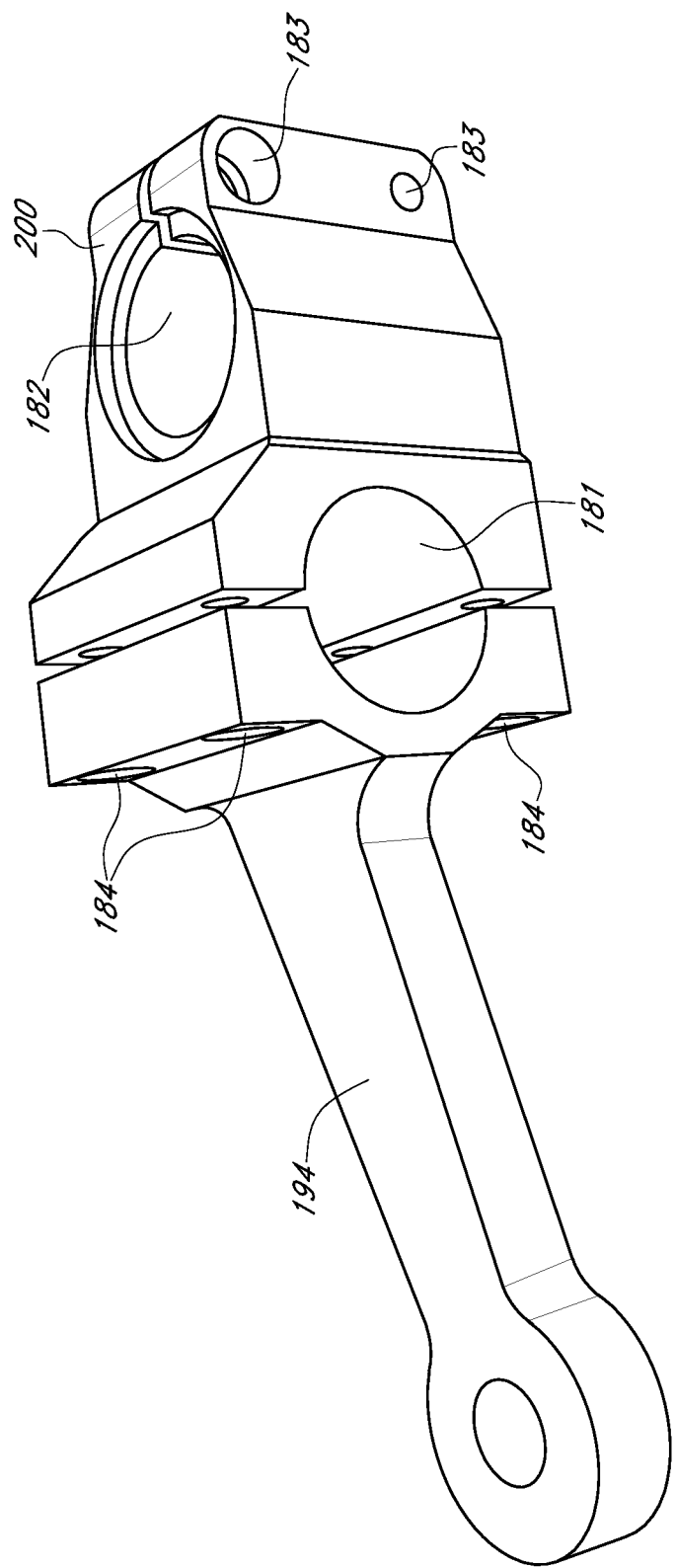
FIG. 6 is a perspective view of the handlebar mount and steering arm visible in FIG. 2 and FIG. 5.

FIG. 6 illustrates the handlebar clamping mechanism of the steering arm 194 portion and the steerer tube portion of the handlebar mounts 200. In a preferred embodiment, machine screws can be used to fasten the steering arm 194 portion to the steerer tube portion of the handlebar mount or "stem" 200 through holes 184 to exert a clamping force with the semi-cylindrical surfaces 181 on a handlebar when inserted between the semi-cylindrical surfaces 181. Because of symmetry in the location of the fastening holes 184, the steering arm 194 portion can be mounted upside down to accommodate the left or right side of the Ackerman steering geometry. To retain the handlebar against a fork, the handlebar mount 200 cylindrical clamping area 182 slides over the fork tube of a typical, commercially available fork assembly and clamps to the fork steerer tube using machine screws, which in a preferred assembly fasten through holes 183 and exert a clamping force on the cylindrical clamping area 182.

With reference to FIG. 5 and FIG. 6, the steering assembly 190 is at least partially made of lightweight aluminum, such as 6061 T6 aluminum. However, in some embodiments, the steering assembly 190 can include other structurally rigid and strong materials, such as for example steel, fiberglass, composites, or plastics. In some embodiments, the handlebars 192 can include a non-slip texture and/or cover, such as for example a ribbed rubber cover.

Overhead Carrying Racks

Figure 7:
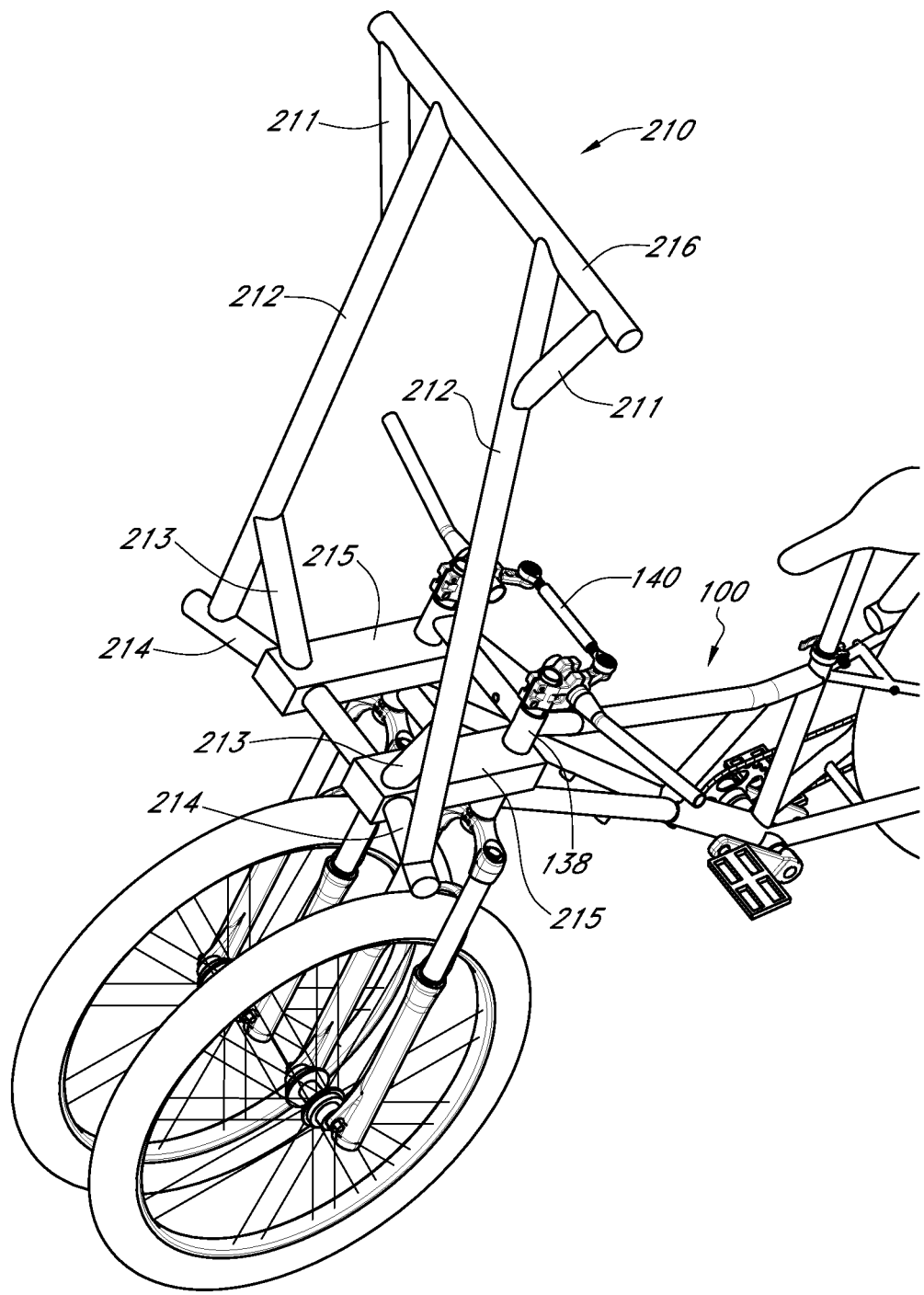
FIG. 7 is a top perspective view of the front of the cycle in FIG. 1 with the front section of an overhead cargo rack.

FIG. 7 illustrates the front section of an overhead rack that in conjunction with the rear overhead rack, allows the overhead transport of long cargo objects such as surfboards, snowboards, ski-equipment or sea-kayaks due to the increased stability of the underlying cycle 100. The front overhead rack 210 connects to the cycle via connecting members 215 to frame 150 (e.g., the head tubes 138 or cross tubes 140) with a connector, such as a clamping mechanism using machine screws or other spring-loaded clamping mechanism. To support long cargo objects, the support member 216 connects via a tubular welded truss frame to the connecting members 215. The upright supports 212 are welded to the front cross supports 214 on both sides of the steering to avoid obstructing the front vision of the rider seated on cycle 100 and raise the support member 216 above the riders head. Angled upper truss members 211 and lower truss members 213 increase the rigidity of the truss frame and reduce the tendency of the truss frame to sway when the cargo object is in place above the riders head. The design of angles and truss member lengths can be modified or optimized by those familiar with structural engineering to increase the natural frequency of the truss frame and minimize the weight of the frame. In this embodiment, increasing the natural frequency of the truss frame design above 5 Hz minimizes the sway of the cargo object particularly in sudden turns or stops by the rider.

Figure 8:
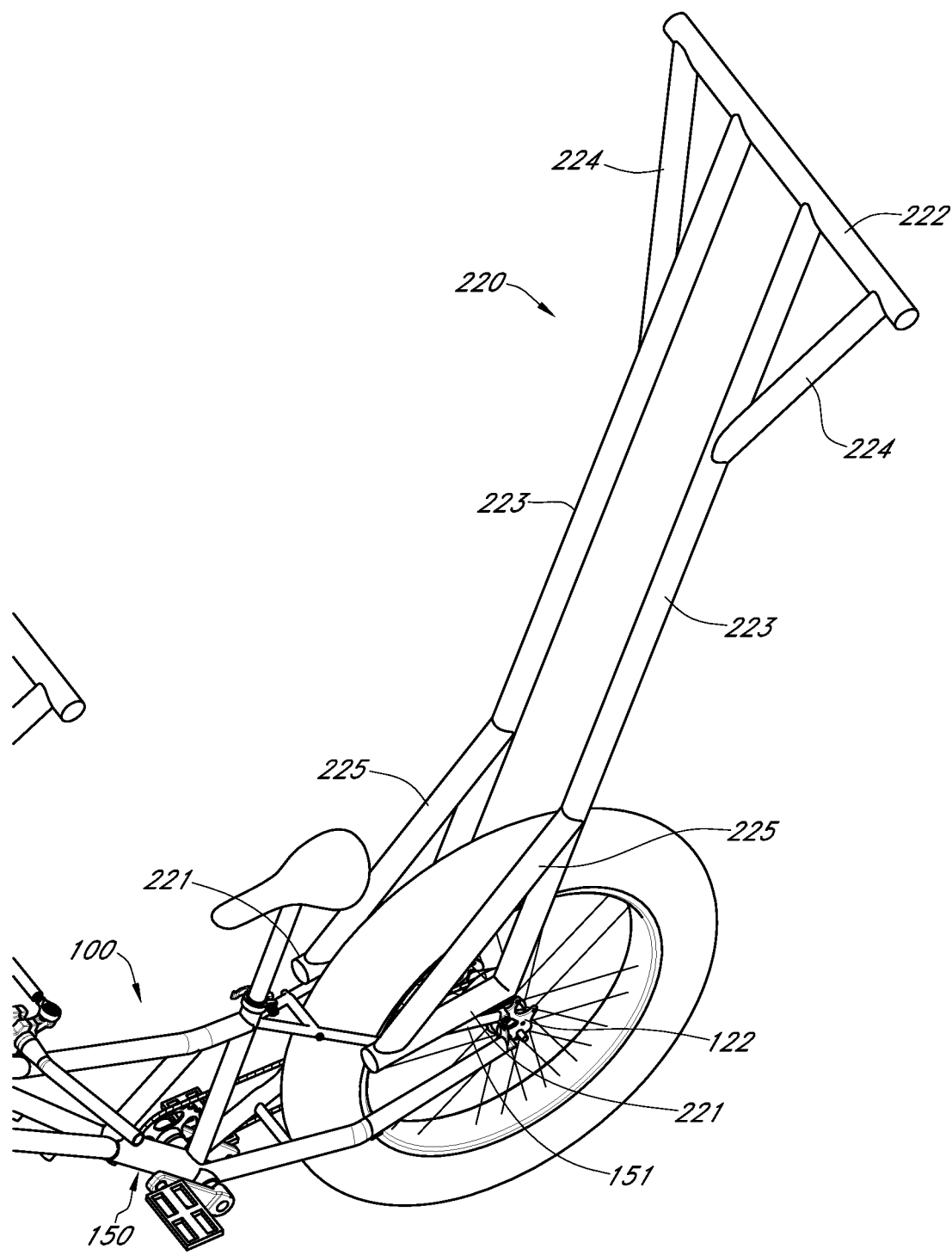
FIG. 8 is a top perspective view of the rear of the cycle in FIG. 1 with the rear section of an overhead cargo rack.

FIG. 8 illustrates the rear section of an overhead rack 220 that in conjunction with the front overhead rack, allows the overhead transport of long cargo objects such as surfboards, sea-equipment or sea-kayaks due to the increased stability of the underlying cycle 100. The rear overhead rack 220 connects to the cycle via connecting members 221 to fastening points on frame 150 (e.g., the upper support members 151 of the rear of the frame 100) using machine screws and, in some configurations, also to the axle 122 of the rear wheel 120 either on the axle 122 directly or using machine screws to connect to fastening points around the axle 122 attached to the frame 150. To support long cargo objects, the support member 222 can connect via a tubular welded truss frame to the connecting members 221. The upright supports 223 are welded to the support members 221 on both sides of the cycle to improve rigidity of the truss frame and raise the support member 222 above the riders head. Angled upper truss members 224 and lower truss members 225 increase the rigidity of the truss frame and reduce the tendency of the truss frame to sway when the cargo object is in place above the riders head. In this embodiment, increasing the natural frequency of the truss frame design above 5 Hz minimizes the sway of the cargo object particularly in sudden turns or stops by the rider.

With reference to FIG. 7 and FIG. 8, the truss frame assemblies 210 and 220 are at least partially made of lightweight aluminum, such as 6061 T6 aluminum. However, in some embodiments, the assemblies 210 and 220 can include other structurally rigid and strong materials, such as for example steel, fiberglass, composites, or plastics. In some embodiments, the two assemblies can form a single assembly by attaching structural members between the front rack 210 and rear assembly 220 to further enhance stability while the rider carries long objects overhead.

Advantages

The disclosed cycle 100 can adapt a dual suspension mountain bike frame to have two wheels in front, as opposed to one. Mountain bike suspension on the two front wheels 110 can help facilitate weight distribution in turns and shock absorption on uneven surfaces. To enable the rider to maintain contact of both wheels in sharp turns, the fork suspension compresses and decompresses as the rider leans into turns. Furthermore, the added stability of three wheels instead of two allows for the rider to implement a system of overhead racks and carry long cargo objects.

The rear wheel of the cycle 100 can be powered by the rider through the pedals 154. Having two wheels in front allows the rider to find stability at very low speeds, which can be advantageous when climbing hills and or riding on loose surfaces. The upright riding position can be beneficial for the rider in producing torque in the rear wheel 120 through the pedals to help facilitate climbing steep hills and stairs.

In some embodiments, the cycle 100 can be power-assisted by a motor or other drive device to augment the rider's pedaling power. For example, one or both of the front wheels 110 can be connected to a motor to provide power-assist. In other embodiments, the rear wheel 120 can be connected to a power-assist device. The power-assisted configuration can advantageously support the rider when climbing hills or negotiating difficult surfaces such as sand and loose rock. The power-assist configuration is also advantageous for climbing stairs.

The design of the three-wheeled prone cycle illustrated in the figures can allow for stability at low speeds such as when carrying a load beyond that of the rider alone or when encountering a change in terrain that makes it difficult for the rider to begin pedaling (e.g. a transition from a stop to a steep up hill). In some embodiments, a rack, platform or container can be mounted to the cycle 100 for securing cargo loads. In some embodiments, the rack, platform or container can be positioned above the rider, or at least partially above the rider.

In the figures, some elements have been represented in a schematic way in areas to facilitate conceptual understanding. For example, the connectors and fasteners that can be utilized to assemble the cycle have been particularly schematic, since these depend not only on the concrete realization of the illustrated embodiment, but the design and shape of specific embodiments of the components of the cycle being used. Obviously, there are numerous alternatives to what is shown.

Although these apparatuses and methods have been disclosed in the context of certain preferred embodiments and examples, it will be understood by those skilled in the art that the present cycle and portions thereof can extend beyond the specifically disclosed embodiments to other alternative embodiments and/or uses of the devices and obvious modifications and equivalents thereof. In addition, while several variations of the devices have been shown and described in detail, other modifications, which are within the scope of this application, will be readily apparent to those of skill in the art based upon this disclosure. It is also contemplated that various combination or sub-combinations of the specific features and aspects of the embodiments may be made and still fall within the scope of the present disclosure. It should be understood that various features and aspects of the disclosed embodiments can be combined with or substituted for one another in order to form varying modes of the disclosed devices. Thus, it is intended that the scope of at least some of the devices herein disclosed should not be limited by the particular disclosed embodiments described above.

What is claimed is:

1. An upright tricycle, comprising:
a rear wheel; and
a first front wheel and a second front wheel;
a frame that supports a rider in an upright position, wherein the frame further supports the rear wheel, the frame comprising a first head tube and a second head tube spaced from one another in a lateral direction of the tricycle;
a first front fork supported by the first head tube for rotation about a first steering axis, the first front fork supporting the first front wheel;
a second front fork supported by the second head tube for rotation about a second steering axis, the second front fork supporting the second front wheel;
a steering assembly comprising a first handlebar coupled to the first front fork and a second handlebar coupled to the second front fork, wherein the first handlebar is coupled to the second handlebar such that rotation of either one of the first or second handlebar causes rotation of the other of the first or second handlebar;
wherein the first handlebar is coupled to the second handlebar by a connecting rod;
wherein the first handlebar is coupled to the first front fork by a first handlebar mount, wherein a first steering arm is coupled to the first handlebar mount, wherein the second handlebar is coupled to the second front fork by a second handlebar mount, wherein a second steering arm is coupled to the second handlebar mount, and wherein the connecting rod is connected between the first steering arm and the second steering arm.

2. The upright tricycle of claim 1, wherein the first front fork and the second front fork are suspension forks providing suspension travel to the first front wheel and the second front wheel relative to the frame.

3. The upright tricycle of claim 1, wherein the connecting rod is adjustable in length.

4. The upright tricycle of claim 1, wherein the connecting rod is the only linkage member rotationally coupling the first front wheel and the second front wheel.

5. The upright tricycle of claim 1, wherein the first steering arm is a removable portion of the first handlebar mount and the second steering arm is a removable portion of the second handlebar mount such that the first and second steering arms can be replaced to alter a steering geometry of the steering assembly.

6. The upright tricycle of claim 1, wherein the first steering arm and the second steering arm extend in a rearward direction from the first front fork and the second front fork, respectively.

7. The upright tricycle of claim 6, wherein the first steering arm and the second steering arm are angled inwardly towards one another.

8. The upright tricycle of claim 6, wherein the first handlebar is positioned between the first front fork and the first steering arm and wherein the second handlebar is positioned between the second front fork and the second steering arm in the longitudinal direction of the tricycle.

9. The upright tricycle of claim 1, wherein the first front wheel and the second front wheel each comprise a front tire width of at least 1.5 inches and wherein the rear wheel comprises a rear tire width of at least 3 inches.

10. The upright tricycle of claim 1, wherein the first handlebar is separate from the second handlebar.

11. An upright tricycle, comprising:
a rear wheel; and
a first front wheel and a second front wheel;
a frame that supports a rider in an upright position, wherein the frame further supports the rear wheel, the frame comprising a first head tube and a second head tube spaced from one another in a lateral direction of the tricycle;
a first front fork supported by the first head tube for rotation about a first steering axis, the first front fork supporting the first front wheel;
a second front fork supported by the second head tube for rotation about a second steering axis, the second front fork supporting the second front wheel;
a steering assembly comprising a first handlebar coupled to the first front fork and a second handlebar coupled to the second front fork, wherein the first handlebar is coupled to the second handlebar such that rotation of either one of the first or second handlebar causes rotation of the other of the first or second handlebar; and
at least one overhead rack coupled to the frame.

12. The upright tricycle of claim 11, wherein the at least one overhead rack comprises a front rack portion and a rear rack portion.

13. The upright tricycle of claim 12, wherein each of the front rack portion and the rear rack portion comprises an upper, horizontal support member.

14. The upright tricycle of claim 11, wherein the first handlebar is coupled to the second handlebar by a connecting rod.

15. The upright tricycle of claim 14, wherein the first handlebar is coupled to the first front fork by a first handlebar mount, wherein a first steering arm is coupled to the first handlebar mount, wherein the second handlebar is coupled to the second front fork by a second handlebar mount, wherein a second steering arm is coupled to the second handlebar mount, and wherein the connecting rod is connected between the first steering arm and the second steering arm.

* * * * *